US009824470B2

(12) United States Patent
Kuo

(10) Patent No.: US 9,824,470 B2
(45) Date of Patent: Nov. 21, 2017

(54) USE OF DYNAMIC NUMERIC AXIS TO INDICATE AND HIGHLIGHT DATA RANGES

(71) Applicant: Heng-Chun Scott Kuo, Vancouver (CA)

(72) Inventor: Heng-Chun Scott Kuo, Vancouver (CA)

(73) Assignee: Business Objects Software Ltd., Dublin (IE)

( * ) Notice: Subject to any disclaimer, the term of this patent is extended or adjusted under 35 U.S.C. 154(b) by 332 days.

(21) Appl. No.: 13/724,258

(22) Filed: Dec. 21, 2012

(65) Prior Publication Data
US 2014/0176555 A1 Jun. 26, 2014

(51) Int. Cl.
*G09G 5/00* (2006.01)
*G06T 11/20* (2006.01)

(52) U.S. Cl.
CPC ................................. *G06T 11/206* (2013.01)

(58) Field of Classification Search
CPC .................................................... G06T 11/206
USPC ....................................................... 345/440
See application file for complete search history.

(56) References Cited

U.S. PATENT DOCUMENTS

| 4,674,043 A * | 6/1987 | Hernandez ............ G06F 17/246 345/440 |
| 4,847,785 A * | 7/1989 | Stephens ....................... 345/440 |
| 5,581,677 A * | 12/1996 | Myers ................... G06T 11/206 345/440 |
| 6,188,403 B1 * | 2/2001 | Sacerdoti et al. ............ 715/764 |
| 6,927,771 B2 * | 8/2005 | Ikami ................... G06T 11/206 345/440 |
| 7,199,796 B2 * | 4/2007 | Bennett et al. ............ 345/440.1 |
| 7,496,852 B2 * | 2/2009 | Eichorn ............ G06F 17/30572 707/999.101 |
| 7,584,415 B2 * | 9/2009 | Cory ..................... G06T 11/206 715/211 |
| 7,716,173 B2 * | 5/2010 | Stolte ................ G06F 17/30592 707/600 |
| 8,782,511 B2 * | 7/2014 | Shimizu .............. G06F 3/04883 382/203 |
| 8,959,423 B2 * | 2/2015 | Hammoud ..................... 715/205 |
| 9,035,948 B2 * | 5/2015 | Greenfield .................... 345/440 |
| 9,244,802 B2 * | 1/2016 | Yalovsky .............. G06F 11/321 |
| 2002/0118221 A1 * | 8/2002 | Hudson ................. G06F 17/246 715/711 |
| 2003/0193502 A1 * | 10/2003 | Patel et al. .................... 345/440 |
| 2008/0082659 A1 * | 4/2008 | Haslehurst .......... G06F 19/3418 709/224 |
| 2008/0189634 A1 * | 8/2008 | Tevanian ............... G06Q 40/06 715/764 |
| 2008/0195643 A1 * | 8/2008 | Sheth-Voss ......... G06F 17/3056 |
| 2009/0144313 A1 * | 6/2009 | Hodge ............. G06F 17/30592 |
| 2009/0147011 A1 * | 6/2009 | Buck .................. G06F 19/3487 345/501 |

(Continued)

*Primary Examiner* — M Good Johnson
(74) *Attorney, Agent, or Firm* — Schwegman Lundberg & Woessner, P.A.

(57) ABSTRACT

A method and system for highlighting portions of a graph based on exception highlight rules is described. Highlight rules for a graph are received from a selection of a portion of an axis of the graph. Portions of the graph satisfying the highlight rules are identified. Visualization on the graph is generated to highlight the identified portions of the graph satisfying the highlight rules.

19 Claims, 13 Drawing Sheets

(56) References Cited

U.S. PATENT DOCUMENTS

| | | | |
|---|---|---|---|
| 2011/0115814 A1* | 5/2011 | Heimendinger | G06F 3/04883 345/619 |
| 2013/0041792 A1* | 2/2013 | King | G06Q 50/00 705/30 |
| 2013/0187923 A1* | 7/2013 | Yoshimoto | G06T 11/206 345/440 |
| 2013/0187948 A1* | 7/2013 | Yoshimoto | G06F 3/04883 345/629 |
| 2013/0249917 A1* | 9/2013 | Fanning | G06F 11/323 345/440 |
| 2014/0033101 A1* | 1/2014 | Rein | G06F 17/30575 715/771 |
| 2014/0300603 A1* | 10/2014 | Greenfield | 345/440 |

* cited by examiner

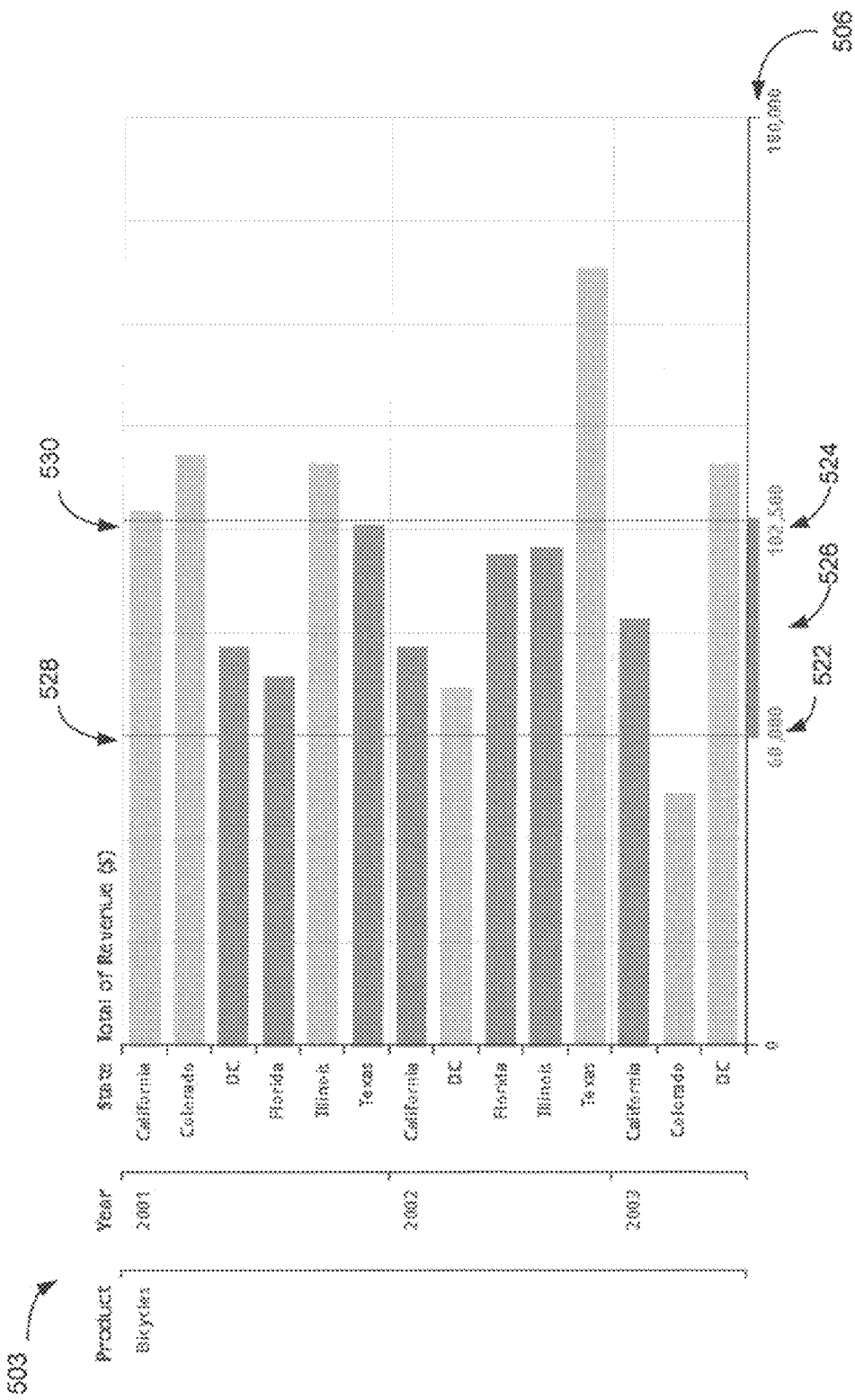

USE OF DYNAMIC NUMERIC AXIS TO INDICATE AND HIGHLIGHT DATA RANGES

FIELD

The present disclosure relates generally to a user interface visualization component, and in a specific example embodiment, to exception highlighting interactions of a user interface visualization component.

BACKGROUND

Visualization of data in the form of a graph is commonly performed by using a computer application such as a spread sheet application to generate a graph. For example, the visualization of data can take the form of a bar chart, a graph, and a pie. The charts are typically generated on a two-dimensional or three-dimensional axis graph where the charts represent data from data structures from a spread sheet or database. Manipulation of the charts is typically performed by specifying the relevant data in the spread sheet application. A user would manually determine areas in the graph to highlight to emphasize attention. The user would then draw on the graph or mark up those areas of interest in the graph accordingly.

BRIEF DESCRIPTION OF DRAWINGS

The appended drawings merely illustrate example embodiments of the present invention and cannot be considered as limiting its scope.

FIG. 5D is a diagram illustrating another example graph using the exception highlight application.

DETAILED DESCRIPTION

Figure 1:
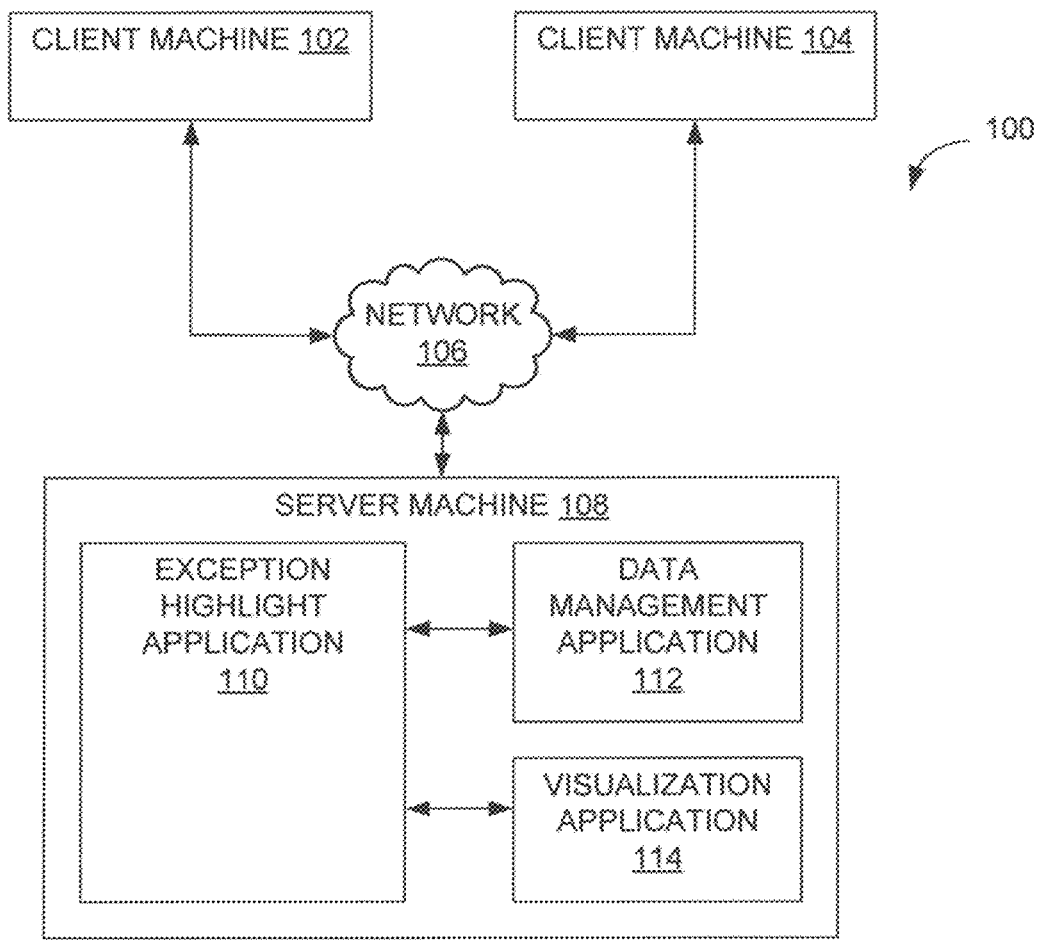
FIG. 1 is a block diagram illustrating an example of a system in which embodiments may be practiced.

The description that follows includes systems, methods, techniques, instruction sequences, and computing machine program products that embody illustrative embodiments of the present invention. In the following description, for purposes of explanation, numerous specific details are set forth in order to provide an understanding of various embodiments. It will be evident, however, to those skilled in the art that embodiments of the inventive subject matter may be practiced without these specific details. In general well-known instruction instances, protocols, structures, and techniques have not been shown in detail.

Example systems and methods for highlighting portions of a graph based on exception highlight rules are described. Highlight rules for a graph are received. Portions of the graph satisfying the highlight rules are identified. Visualization on the graph is generated to highlight the identified portions of the graph satisfying the highlight rules. The graph may be regenerated or rendered to include the visualization on the graph to highlight the identified portions of the graph satisfying the highlight rules.

In one embodiment, a display of the graph may be generated using an application of a computer. The graph may comprise at least two axes and a chart (body of the graph such as bars and lines). A user input may be received on the display identifying a range on one of the axes. Highlight rules may be generated based on the identified range on the axis. In another embodiment, a user input is received identifying a range on the axis. Highlight rules may be formed based on the identified range on the axis.

In one embodiment, a user input may be received on a display of the graph identifying a graph element (e.g., a bar or a line). A summary of data corresponding to the graph element may be computed. A display of the summary of data corresponding to the graph element on the display of the graph may be generated.

In one embodiment, the highlight rules can Include a data exceeding a user-selected threshold rule, a data within a user-selected threshold rule, a data within a user-selected range rule, a data outside a user-selected range rule, and a data meeting a user-selected threshold rule.

In one embodiment, a visualization for an axis of the graph and for a graph element corresponding to the portions of the graph satisfying the highlight rules are generated to highlight the identified portions of the graph satisfying the highlight rules.

In one embodiment visualization for a portion of an axis of the graph may be generated. The portion of the axis may correspond to a range identified in the highlight rules. A visual format of at least one graph element corresponding to the portions of the graph may be modified relative to the format of other graph elements that do not satisfy the highlight rules. The modification may include generating at least one graph element corresponding to the portions of the graph in a different color than the color of the other graph elements that do not satisfy the highlight rules. The modification may also include generating at least one graph element corresponding to the portions of the graph in a larger shape relative to the shape of the other graph elements that do not satisfy the highlight rules.

FIG. 1 is a block diagram depicting an example environment 100 within which example embodiments may be deployed. The environment 100 includes one or more client machines (e.g., client machines 102, 104). For example, the client machines 102, 104 may be a personal computer, or a mobile computing device of participants of a business task.

In one embodiment, the client machine 102 may be used to access elements or processes from a server machine 108. For example, a user interface in the form of a web browser or an application may be provided for the user to access and visualize data from the server machine 108. The client machine 102 may execute a web browser (not shown) or a software application (not shown) to access a graph or a chart from the server machine 108. For example, the web browser may be any browser commonly used to access a network of computers such as the World Wide Web. The web browser may load a user interface to retrieve a graphical visualization of data hosted at the server machine 108 or at another location such as a remote or networked storage server. In another embodiment, the client machine 102 stores the data to be visualized and loads an application on the client machine 102 to render a graph or chart based on the data at the client machine 102.

The environment 100 may also include the server machine 108. The server machine 108 executes one or more applications: an exception highlight application 110, a data management application 112, and a visualization application 114.

The data management application 112 includes, for example, a database application configured to retrieve data front a data structure stored in a storage device (not shown) of the server machine 108 or from a networked storage device. The data may include, for example, sales figures, historical data, or revenue statistics for a business application. The data management application 112 may be hosted in the server machine 108 or in the client machine 102.

In one embodiment, the visualization application 114 may be configured to generate a visualization display for the data from data management application 112. For example, the visualization display may include a graph or chart rendered based on sales figures accessed by the data management application 112. Those of ordinary skill in the art will recognize that data from a data structure such as a database or spread sheet can be visualized in many ways: e.g., in two-dimensional bar graphs, two-dimensional plot chart, two-dimensional pie chart, three-dimensional bar graphs, and so forth. The visualization application 114 may be hosted in the server machine 108 and/or in the client machine 102.

The exception highlight application 110 enables a user at the client machine 102 or 104 to define highlight rules for a graph or chart generated by the visualization application 114. For example, the user may be interested in focusing on regions having sales numbers over a user-defined threshold amount in a chart of sales by regions. Typically, a user would have to manually highlight on the chart or graph the regions with sales exceeding the user-defined threshold amount. The user would have to manually generate a threshold line for the user-defined threshold amount on the graph, and individually determine which bar or chart of the regions crosses the threshold line.

The present exception highlight application 110 would automatically highlight components of the graph or chart meeting the highlight rules set up by the user. For example, a region or a store having sales revenues exceeding the user-defined threshold amount may be displayed in a different format than the visualization for the other regions and stores. The bar of the region or store exceeding the user-defined threshold amount may be of a different color or shading or size than the other regions.

The client machines 102, 104, and the server machine 108 may be coupled to each other via a network 106. The network 106 enables communication between systems. Accordingly, the network 106 may be a mobile telephone network, a Plain Old Telephone (POTS) network, a wired network, a wireless network (e.g., a WiFi or WiMax network), or any suitable combination thereof. The communication may be based on any communication protocols. Examples of communication protocols include Transmission Control Protocol/Internet Protocol (TCP/IP), HyperText Transfer Protocol (HTTP), File Transfer Protocol (FTP), Simple Mail Transfer Protocol (SMTP), Post Office Protocol (POP), internet Message Access Protocol (MAP), Wireless Access Protocol (WAP), Gopher, wireless internet protocols, and instant messaging protocols. The network 106 may be implemented using the Internet, a wide area network (WAN), a local area network (LAN), or any suitable combination thereof.

In one embodiment, the user interface at the client machine 102 may generated at the server machine 108 and as such, can be accessible from any client machine. In another embodiment, the user interlace may be generated at the client machine 102 without having to access the server machine 108. For example, the exception highlight application 110, the data management application 112, and the visualization application 114 may reside in the client machine 102.

Figure 2:
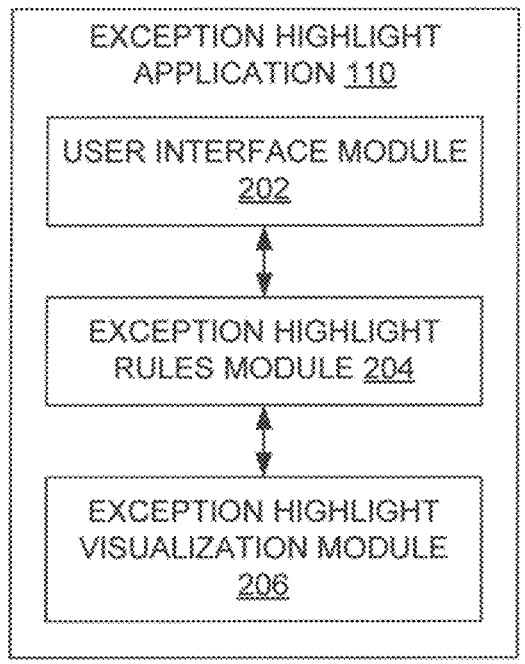
FIG. 2 is a block diagram illustrating an exception highlight application, in accordance with an example embodiment.

FIG. 2 is a block diagram illustrating an example embodiment of the exception highlight application 110. The exception highlight application 110 may include, for example, a user interface module 202, an exception highlight rules module 204, and an exception highlight visualization module 206.

The user interlace module 202 may receive user defined rules, such as highlight rules for a graphical chart. In one embodiment, the riser interface module 202 receives the highlight rules by detecting a users selection and identification of a portion of an axis of the graph. The user may select the portion of the axis of the graph in which he or she is interested in visualizing. The user may tap a touchscreen displaying the chart, or may use a user input device such as a mouse to control a pointer on a display of the chart. For example, if the user is interested in highlighting bars of a chart with values exceeding a threshold value, the user could click or tap on a display of the threshold value on the graph and drag in the direction of the axis for values exceeding the threshold value. Conversely, if the user is interested in highlighting bars of a chart with values less than a threshold value, the user could click or tap on the threshold value on the graph and drag or swipe in the opposite direction of the axis for values exceeding the threshold value. Similarly, a user may select a range by highlighting the portion of the axis corresponding to the range of interest.

In another embodiment, the user interface module 202 receives the highlight rules by detecting a user's selection of content in the graph. For example, the user may select specific bars or lines fern a chart or graph. The user may also select a legend from a legend box in the chart. When the user selects specific bars from the chart, the user interface module 202 may determine or infer highlight rules based on the selection of the specific bars.

In another embodiment, the user interface module 202 may receive highlight rules in the form Boolean or entry forms from the user on a spreadsheet or database corresponding to the chart. For example, the user may select art operation in the spreadsheet to identify items with values exceeding a certain threshold. Those of ordinary skill in the art will recognize that user interface module 202 may use other methods besides the ones presently illustrated to detect a user's selection corresponding to the graph.

The exception highlight rules module 204 may identify portions of the graph satisfying or meeting the highlight rides. For example, if the highlight rules include identifying values exceeding a threshold value, the exception highlight rules module 204 analyzes the value of each bar or line chart to determine whether the corresponding bar has a value exceeding the threshold value.

The exception highlight visualization module 206 may generate visualization on the graph to highlight the identified portions of the graph satisfying the highlight rules. For example, the exception highlight visualization module 206 may increase the size or change the shape or color of the corresponding individual bars of the chart that meet the highlight rules relative to the individual bars of the chart that do meet the highlight rules.

In one embodiment, the exception highlight visualization module 206 renders or regenerates the graph to include visualization of the highlights of the identified portions of the graph satisfying the highlight rules. For example, the exception highlight visualization module 206 may instruct the visualization application 114, a graphical rendering engine, or a spreadsheet application to regenerate the graph using the highlight rules to highlight elements of a chart that satisfy or meet the highlight rules.

In another embodiment, the exception highlight visualization module 206 does not regenerate the entire graph to include visualization of the highlights of the identified portions of the graph satisfying the highlight rules. For example, the exception highlight visualization module 206 may identity portions or elements of the graph (individual bars) that meet the highlight rules (e.g., exceeding a user-selected threshold value). The exception highlight visualization module 206 then regenerates or redraws only the portions of the elements of the graph that meet the highlight rules. For example, an individual bar of a graph may be redrawn over the previous individual bar with a different color, shading, or size to highlight the individual bar. In another example, the individual bar of a graph may be identified to the user with an arrow, an asterisk, a bracket, or any other symbols or visual indicators in the display of the graph. Drawing or rendering portions of the graph may be more efficient than re-rendering the entire graph since there would be no need to re-access the entire set of data needed to render the whole graph. In yet another embodiment, the exception highlight visualization module 206 does not regenerate any portion of the display of the graph. Instead, the exception highlight visualization module 206 may draw on top of the individual bar of the graph with a different color, shading, or size to highlight the individual bar.

Figure 3:
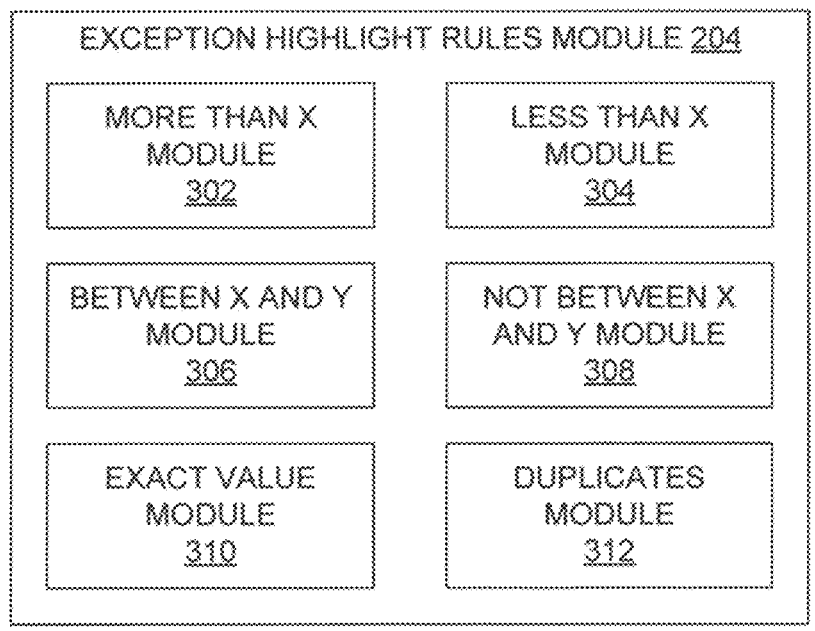
FIG. 3 is a block diagram illustrating an example embodiment of an exception highlight rules module.

FIG. 3 is a block diagram illustrating an example embodiment of the exception highlight rules module 204. The exception highlight rules module 204 includes, for example, a more than x module 302, a less than x module 304, a between x and y module 306, a not between x and y module 308, an exact value module 310, and a duplicates module 312. The exception highlight rules module 204 is not limited to the previously described modules but may include other types of highlight rules modules. In one embodiment, the user may define and customize his or her highlight rules modules.

The more than x module 302 includes rules for determining values that exceed a user-selected threshold value. The less than x module 304 includes rules for determining values that are lower than a user-selected threshold value. The between x and y module 306 includes rules for determining values between a first user-selected threshold value and a second user-selected threshold value. The not between x and y module 308 includes rules for determining values between a first user-selected threshold value and a second user-selected threshold value. The exact value module 310 includes rules for determining values that match a user-selected threshold value. The duplicates module 312 includes rules for determining values that are duplicates.

Figure 4:
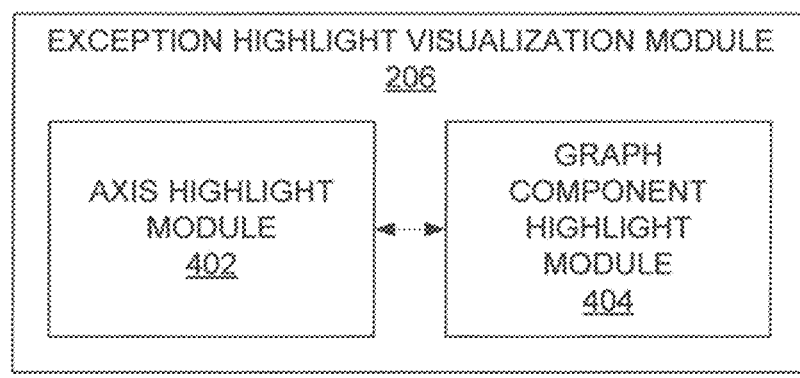
FIG. 4 is a block diagram illustrating an example embodiment of an exception highlight visualization module.

FIG. 4 is a block diagram illustrating an example embodiment of the exception highlight visualization module 206. The exception highlight visualization module 206 includes, for example, an axis highlight module 402, and a graph component highlight module 404.

The axis highlight module 402 may highlight or generate a visual indicator that identifies portions of the axis corresponding to the highlight rules. For example, the portions of the axis may have a thicker line, a different shape, or a different color relative to the display of the portions of the axis that do correspond to the highlight rules.

In one embodiment, the axis highlight module 402 renders or regenerates both axes to include visualization of the portion of the axis of the graph corresponding to the highlight rules. For example, the axis highlight module 402 may instruct the visualization application 114, a graphical rendering engine, or a spreadsheet application to regenerate the graph using the highlight rules to highlight portions of the axis that satisfy or meet the highlight rules.

In another embodiment, the axis highlight module 402 does not regenerate a display of both axes to include visualization of the portion of the axis of the graph corresponding to the highlight rules. For example, the axis highlight module 402 may identify portions of the axis of the graph that meet the highlight rules (e.g., exceeding a user-selected threshold value). The axis highlight module 402 then regenerates or redraws only the portions of the axis of the graph that meet the highlight rules. For example, an axis in a graph may be redrawn over the previous individual bar with a different color, shading, or size to highlight the individual bar. In another example, the axis in the graph may be identified to the user with an arrow, an asterisk, a bracket, or any other symbols or visual indicators in the display of the graph. Drawing or rendering portions of the graph may be more efficient than re-rendering the entire graph since there would be no need to re-access the entire set of data needed to render the whole graph. In yet another embodiment, the axis highlight module 402 does not regenerate any portion of the axis in the display of the graph. Instead, the axis highlight module 402 may draw a visualization indicator on top of the portion of the axis of the graph corresponding to the highlight rules.

The graph component highlight module 404 may highlight or generate a visual indicator that identifies individual bars or lines or portions of the content of the graph that meet the highlight rules. As previously described, the graph component highlight module 404 may generate visualization on the graph to highlight the identified portions of the graph satisfying the highlight rules. For example, the graph component highlight module 404 may increase the size or change the shape or color of the corresponding individual bars or lines of the chart that meet the highlight rules relative to the individual bars or lines of the chart that do meet the highlight rules.

In one embodiment the graph component highlight module 404 renders or regenerates the content of the graph (e.g., all individual bars) to include visualization of the highlights of the identified portions of the graph satisfying the highlight rules. For example, the graph component highlight module 404 may instruct the visualization application 114, a graphical rendering engine, or a spreadsheet application to regenerate the content of the graph using the highlight rules to highlight elements of the graph that satisfy or meet the highlight roles.

In another embodiment, the graph component highlight module 404 does not regenerate the entire content of the graph (e.g., all individual bars) to include visualization of the highlights of the identified portions of the graph satisfying the highlight rules. For example, the graph component highlight module 404 may identify portions or elements of the graph (e.g., individual bars) that meet the highlight rules (e.g., exceeding a user-selected threshold value). The graph component highlight module 404 then regenerates or redraws only the portions of the elements of the graph (e.g. select bars) that meet the highlight rules. For example, an individual bar of a graph may be redrawn over tire previous individual bar with a different color, shading, or size to highlight the individual bar. In another example, the individual bar of a graph may be identified to the user with an arrow, an asterisk, a bracket, or any other symbols or visual Indicators in the display of the graph. Drawing or rendering portions of the graph may be more efficient than re-rendering the entire graph since there would be no need to re-access the entire set of data needed to render the whole graph. In yet another embodiment, the graph component highlight module 404 does not regenerate any portion of the display of the graph. Instead, the graph component highlight module 404 may draw on top of the individual bar of the graph with a different color, shading, or size to highlight the individual bar.

Figure 5A:
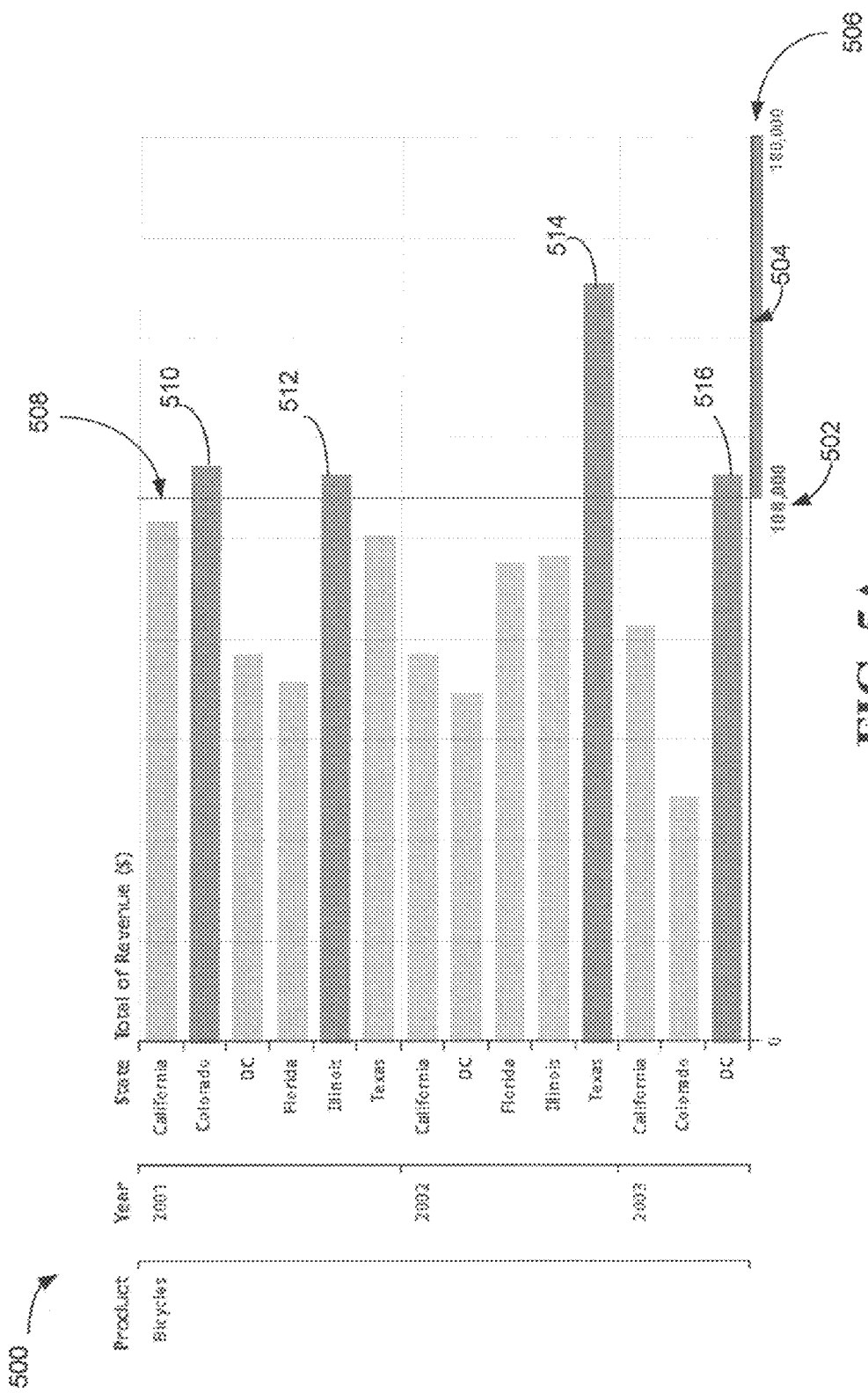
FIG. 5A is a diagram illustrating an example graph rising the exception highlight application.

FIG. 5A is a diagram illustrating an example graph 500 using the exception highlight application 110 of FIG. 1. The graph 500 includes a bar chart of total revenues generated by states over a period of time. The user may have selected a threshold value 502 for the more than x module 302. An axis visual indicator 504 provides a visual overlay or underlay to indicate values more than the threshold value 502 on the axis 506. The visualization may include a bold line under portions of the axis 506 with values more man the threshold value 502. In one embodiment the visual threshold guide 508 corresponding to the threshold value 502 may be displayed on the graph 500. Individual bars 510, 512, 514, and 516 with values meeting the highlight rules, or in this case, exceeding the threshold value 502, are highlighted with a different color, shade, or pattern. In another embodiment, the use of an overlay (e.g., the user interface elements 502 and 504) on the axis eliminates the need to highlight data points by changing the fill color of a data point (e.g., 514) that exceeds the threshold value 502. Using this alternative approach, even a user who is color blind would be able to detect that there is a difference between a chart without the exception and a chart with the exception triggered.

Figure 5B:
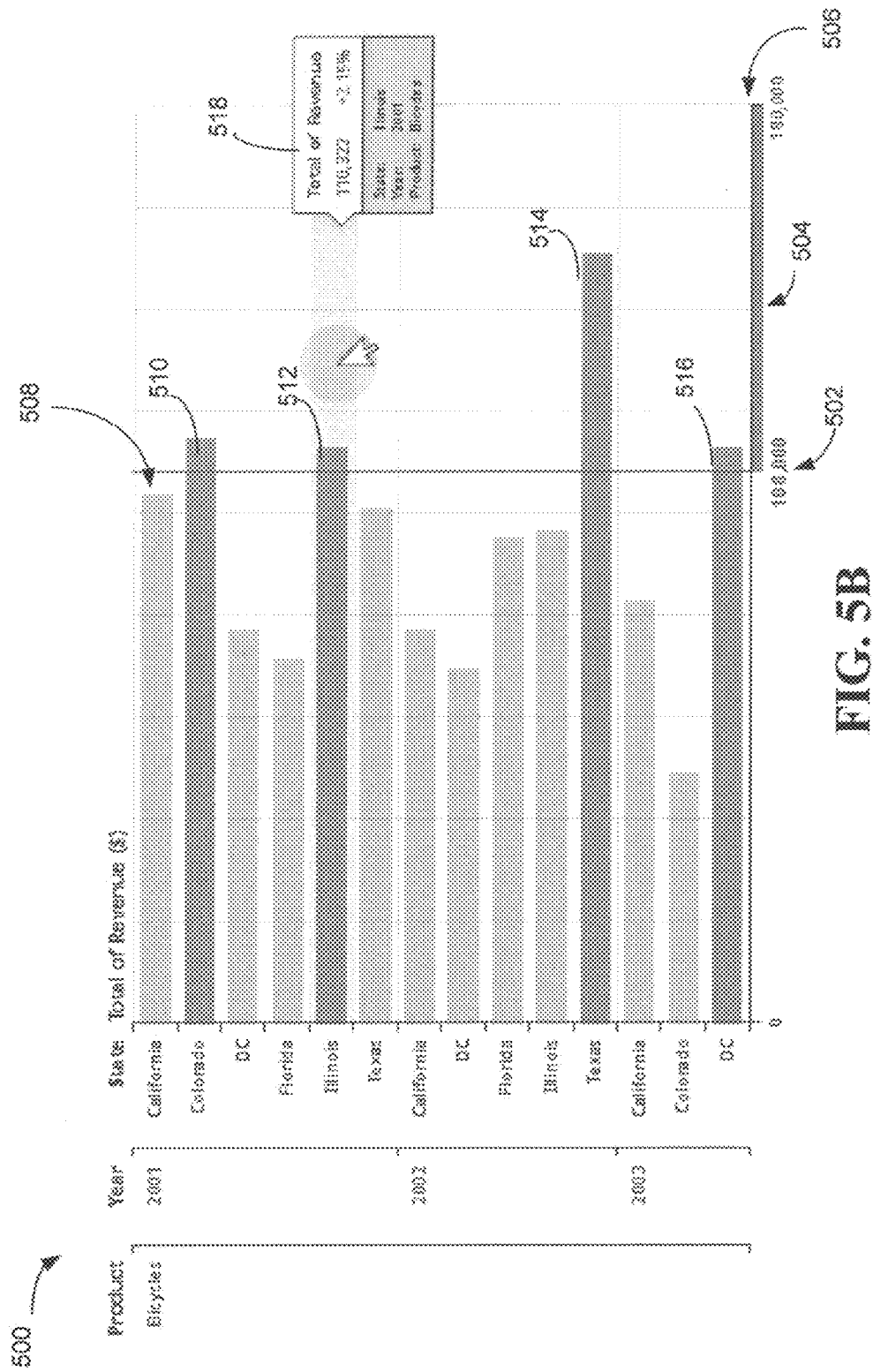
FIG. 5B is a diagram illustrating an example graph displaying summary data using the exception highlight application.

FIG. 5B is a diagram illustrating the example graph 500 displaying summary data using the exception highlight application 110 of FIG. 1. The graph 500 may display summary data corresponding to an individual bar that has been identified by a user. For example, when a user taps on or near the individual bar 512, a display box 518 is generated and includes summary data (e.g., total, revenue, state, year, product) corresponding to the individual bar 512.

Figure 5C:
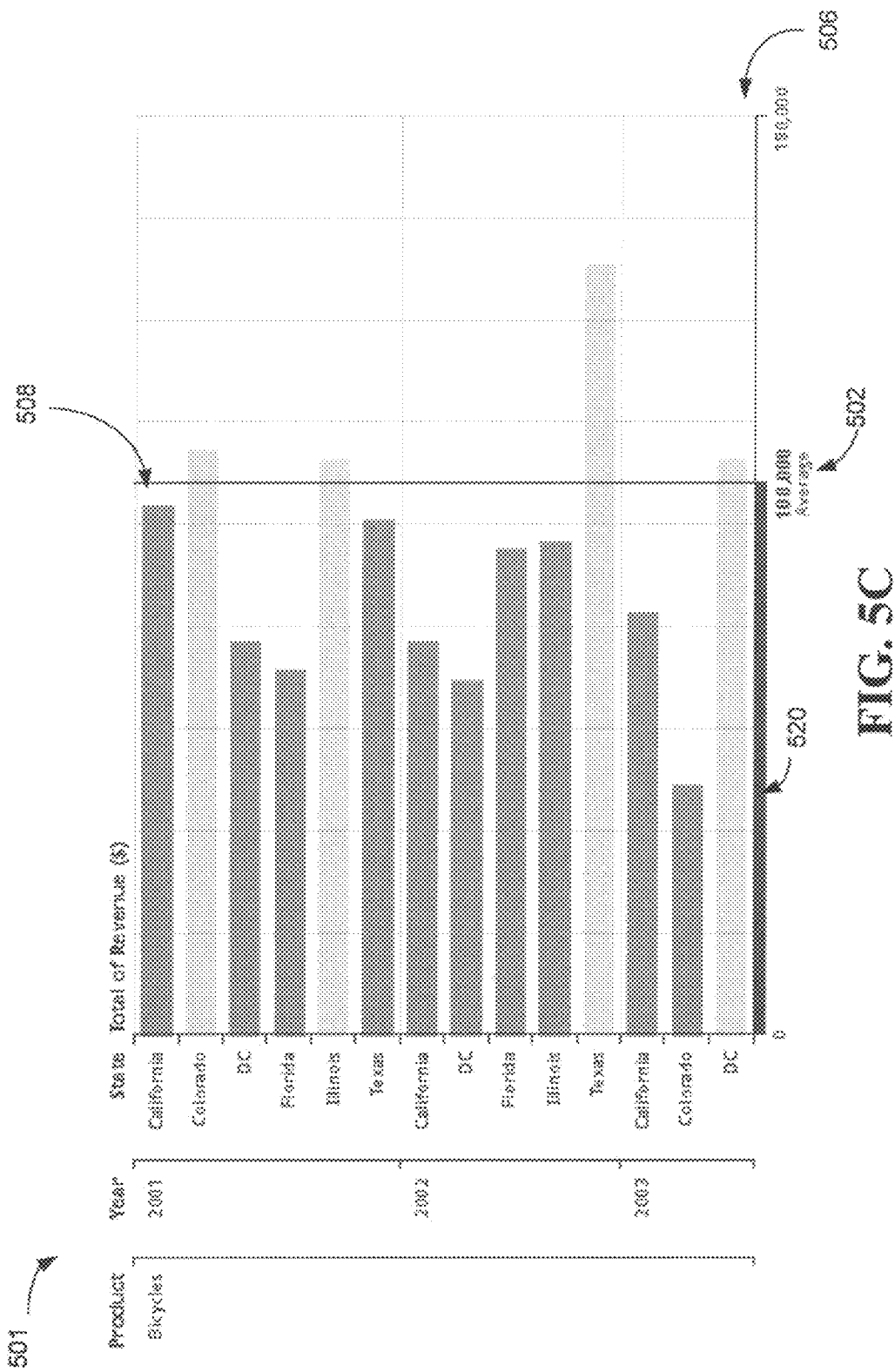
FIG. 5C is a diagram illustrating another example graph using the exception highlight application.

FIG. 5C is a diagram illustrating an example graph 501 using the exception highlight application 110 of FIG. 1. The user may have selected a threshold value 502 for the less than x module 304. An axis visual indicator 520 provides visualization for values less than the threshold value 502 on the axis 506. The visualization may include a bold line under portions of the axis 506 with values less than the threshold value 502. In one embodiment, the visual threshold guide 508 corresponding to the threshold value 502 may be displayed on the graph 501. Individual bars with values meeting the highlight rules, or in this case, less than the threshold value 502, are highlighted with a darker shading color.

FIG. 5D is a diagram illustrating another example graph 503 using the exception highlight application 110 of FIG. 1. The user may have selected a first threshold value 522 and a second threshold value 524 for the between x and y module 306. An axis visual indicator 526 provides visualization for values between the first threshold value 522 and the second threshold value 524 on the axis 506. The visualization may include a bold line under portions of the axis 506 with values between the first threshold value 522 and the second threshold value 524. In one embodiment, a first visual threshold guide 528 corresponding to the first threshold value 522 and a second visual threshold guide 530 corresponding to the second threshold value 524 may be displayed on the graph 503. Individual bars with values meeting the highlight rules, or in this ease, between the first threshold value 522 and the second threshold value 524, are highlighted with a darker shading color.

Figure 5E:
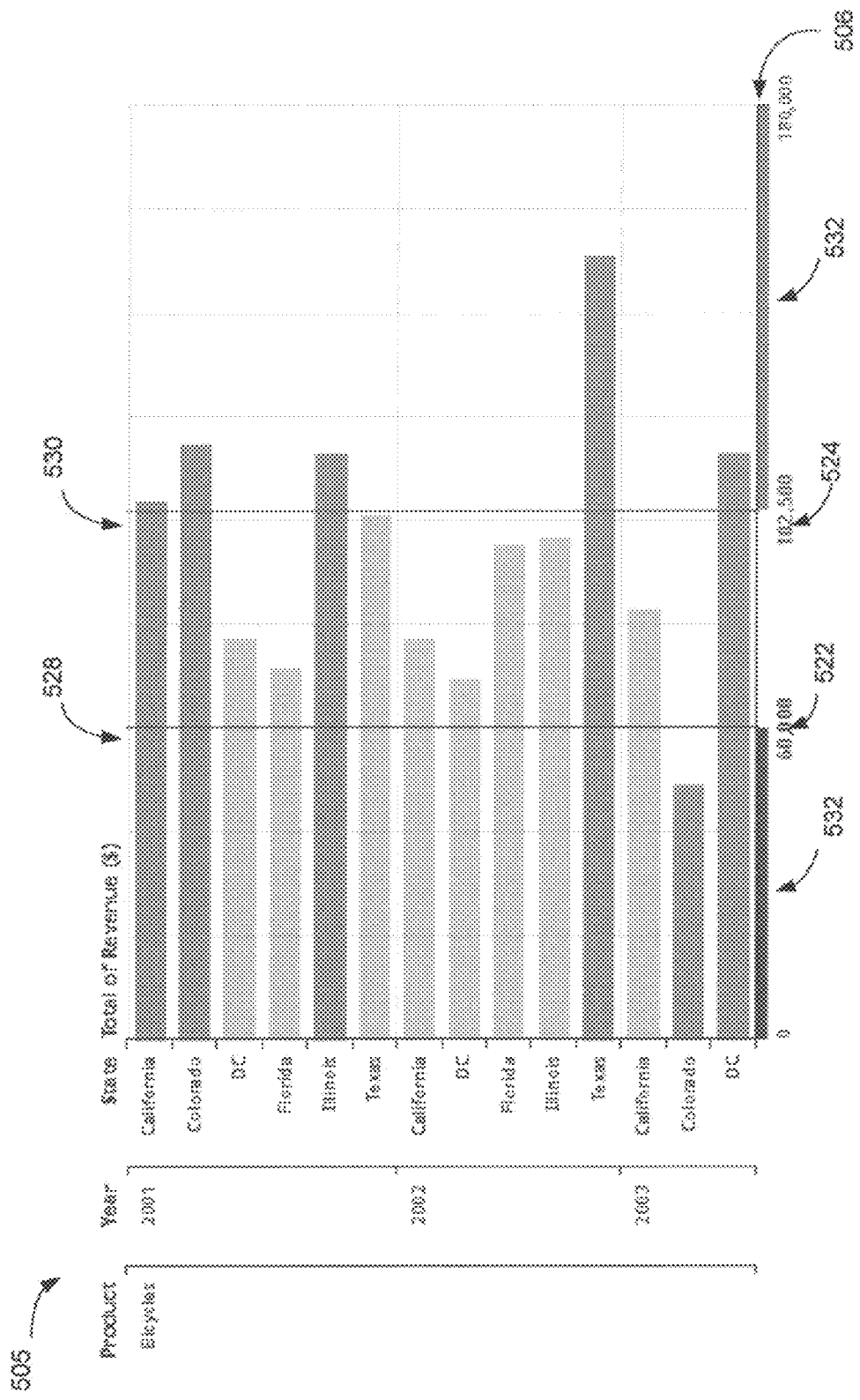
FIG. 5E is a diagram illustrating another example graph using the exception highlight application.

FIG. 5E is a diagram illustrating another example graph 505 using the exception highlight application 110 of FIG. 1. The user may have selected the first threshold value 522 and the second threshold value 524 for the not between x and y module 308. An axis visual indicator 532 provides visualization for values outside the range between first threshold value 522 and the second threshold value 524 on the axis 506. The visualization may include a bold line under portions of the axis 506 with values outside the range between the first threshold value 522 and the second threshold value 524. In one embodiment, the first visual threshold guide 528 corresponding to the first threshold value 522 and the second visual threshold guide 530 corresponding to the second threshold value 524 may be displayed on the graph 505. Individual bars with values meeting the highlight rules, or in this case, outside the range between the first threshold value 522 and the second threshold value 524, are highlighted with a darker shading color.

Figure 5F:
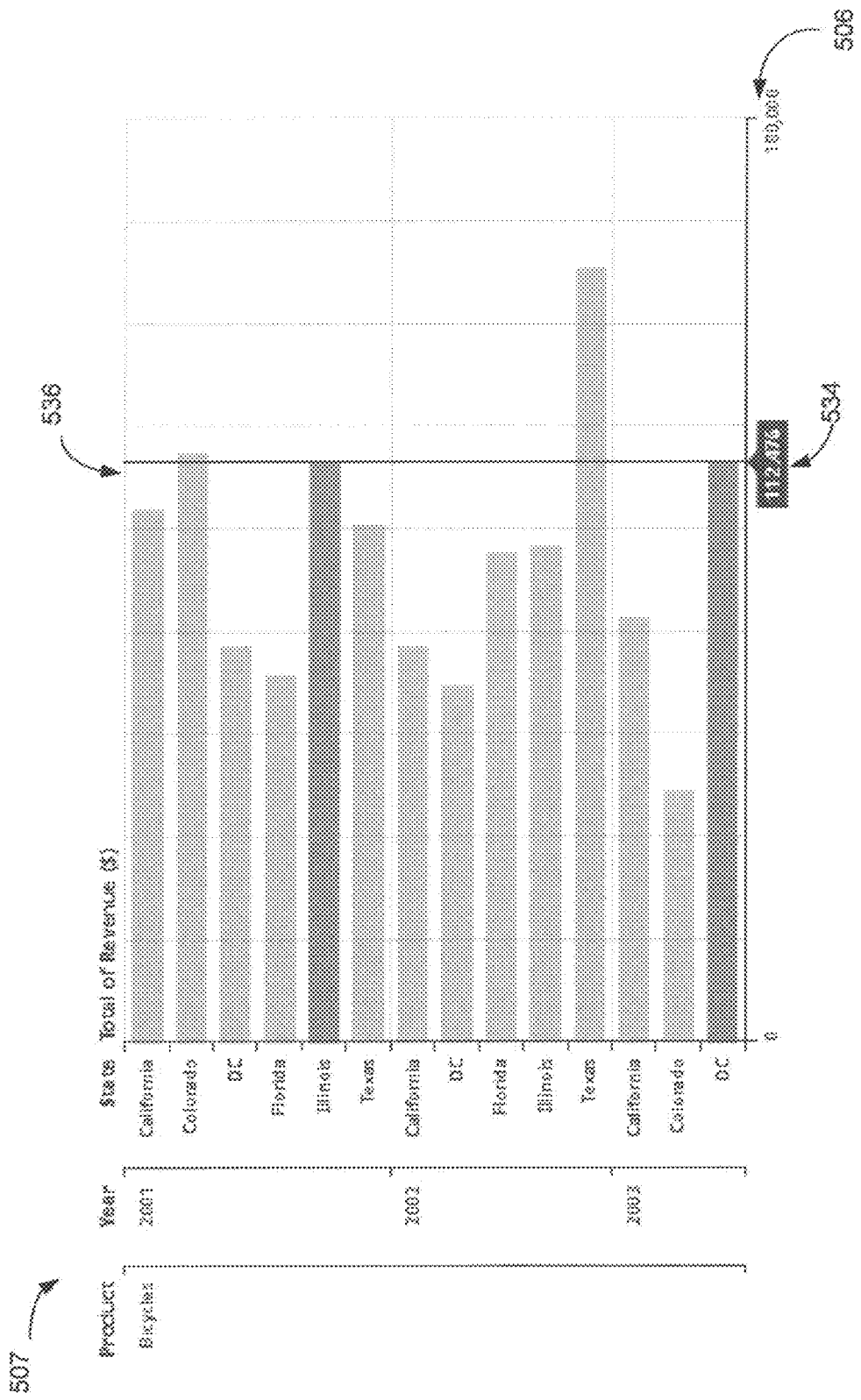
FIG. 5F is a diagram illustrating another example graph using the exception highlight application.

FIG. 5F is a diagram illustrating another example graph 507 using the exception highlight application 110 of FIG. 1. The user may have selected a threshold value 534 for the exact value module 310. In one embodiment, a visual threshold guide 536 corresponding to the threshold value 534 may be displayed on the graph 507. Individual bars with values meeting the highlight rules, or in this case, matching the threshold value 534, are highlighted with a darker shading color.

Figure 6:
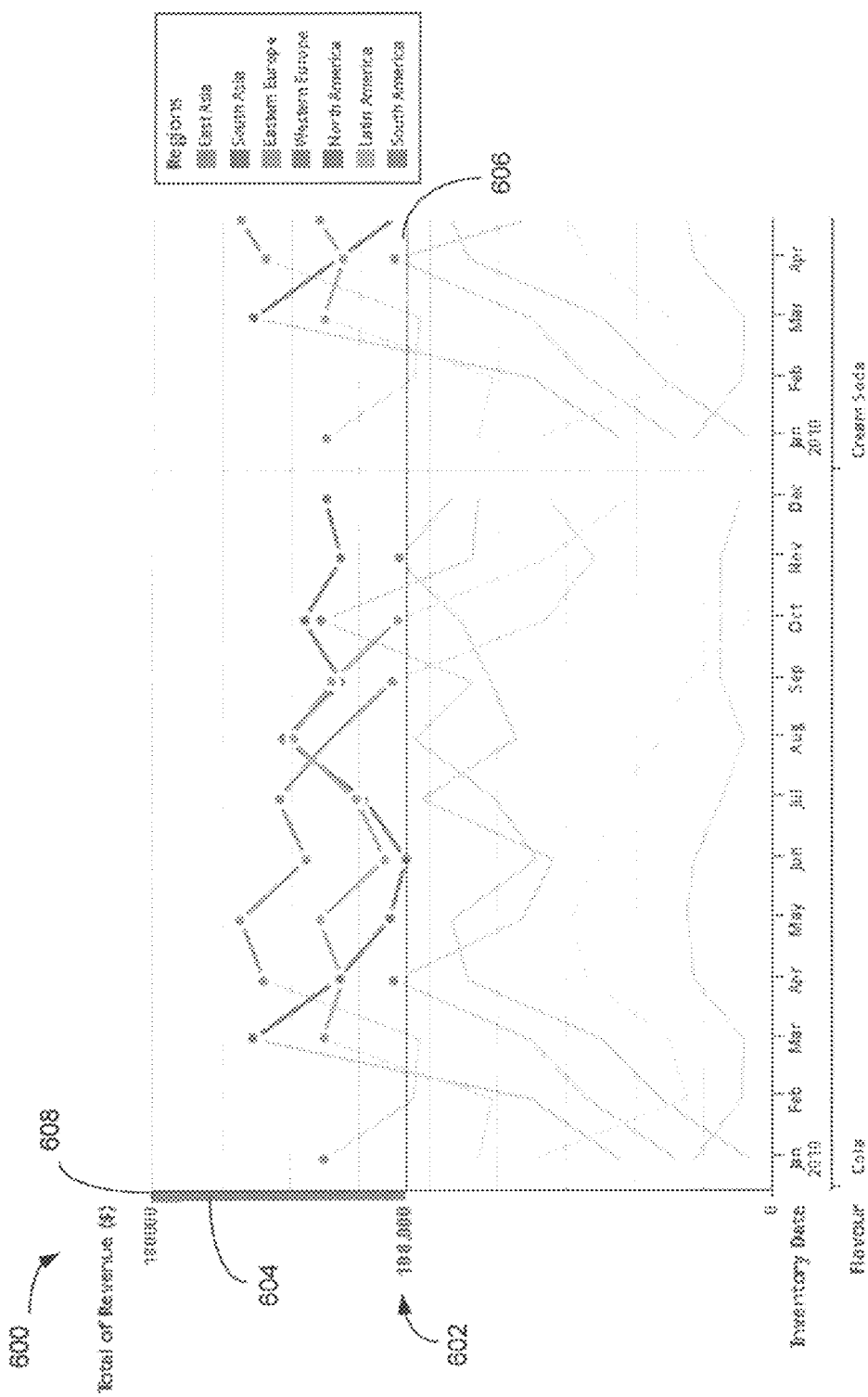
FIG. 6 is a diagram illustrating another example graph using the exception highlight application.

FIG. 6 is a diagram illustrating an example graph 600 using she exception highlight application 110 of FIG. 1. The graph 600 includes a line chars of total revenues generated over a period of time. The user may have selected a threshold value 602 for the more than x module 302. An axis visual indicator 604 provides visualization for values more than the threshold value 602 on the axis 608. The visualization may include a hold line adjacent to portions of the axis 608 with values more than the threshold value 602. In one embodiment, a visual threshold guide 606 corresponding to the threshold value 602 may be displayed on the graph 600. Portions of individual lines with values meeting the highlight rules, or in this case, exceeding the threshold value 602, are highlighted with a darker shading color.

Figure 7:
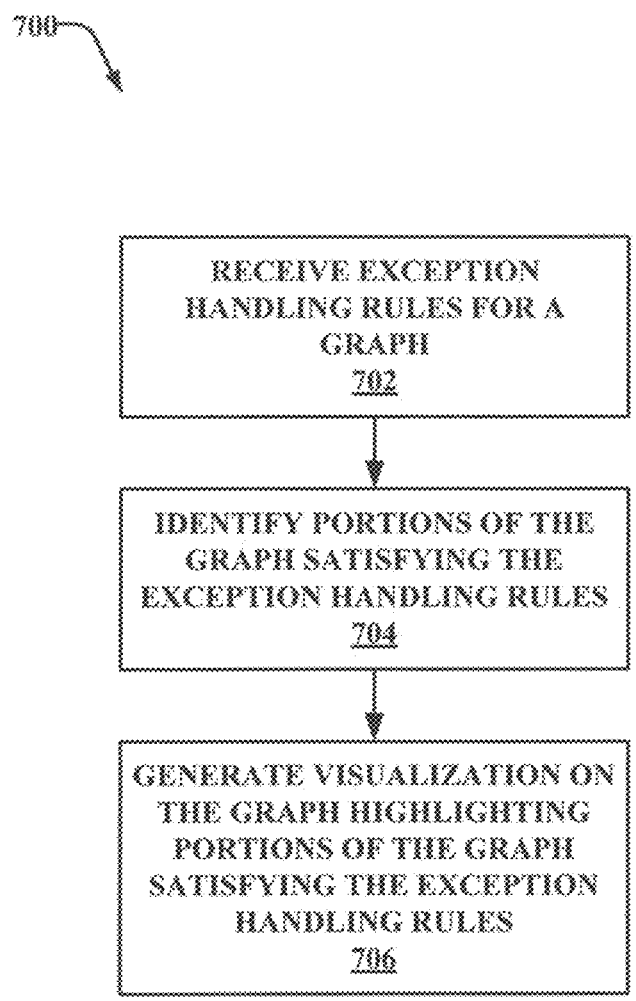
FIG. 7 is a flowchart of a method, in accordance with an example embodiment, for highlighting portions of a graph based on exception highlight rules.

FIG. 7 is a flowchart of a method 700, in accordance with an example embodiment, for highlighting portions of a graph based on exception highlight rules.

At operation 702, exception handling rules for a graph are received. In one embodiments the user interface module 202 of FIG. 2 is configured to receive the exception handling rules from a user.

At operation 704, portions of the graph satisfying or meeting the exception handling rules are identified. In one embodiment, the exception highlight rules module 204 of FIG. 2 is configured to identify portions of the graph satisfying or meeting the exception handling rules.

At operation 706, visualization on the graph highlighting portions of the graph satisfying the exception handling rules are generated. In one embodiment, the exception highlight visualization module 206 of FIG. 2 is configured to generate visualization on the graph highlighting portions of the graph satisfying the exception handling rides.

Figure 8:
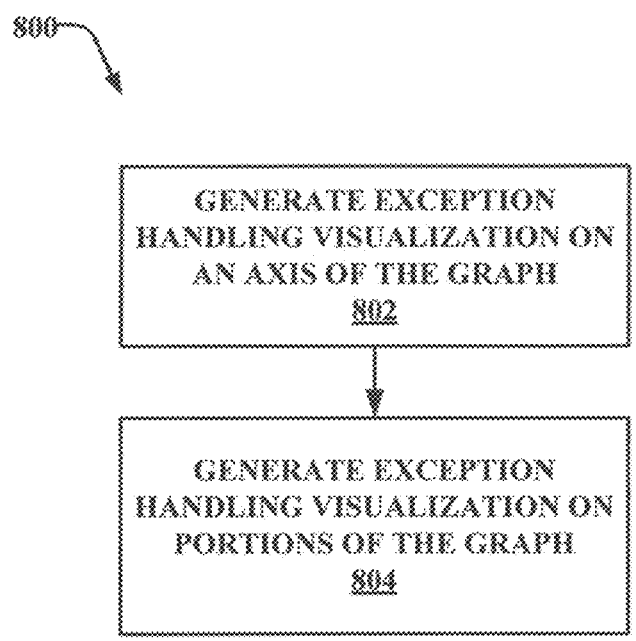
FIG. 8 is a flowchart of a method, in accordance with another example embodiment, for highlighting portions of a graph based on exception highlight rules.

FIG. 8 is a flowchart of a method 800, in accordance with another example embodiment, for highlighting portions of a graph based on exception highlight rules.

At operation 802, exception handling visualization on an axis of the graph is generated. In one embodiment, the axis highlight module 402 of FIG. 4 is configured to generate exception handling visualization on an axis of the graph.

At operation 804, exception handling visualization on portions of the graph is generated. In one embodiment, the graph component highlight module 404 of FIG. 4 is configured to generate exception handling visualization on portions of the graph.

Certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain exemplary embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in the dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or Instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Figure 9:
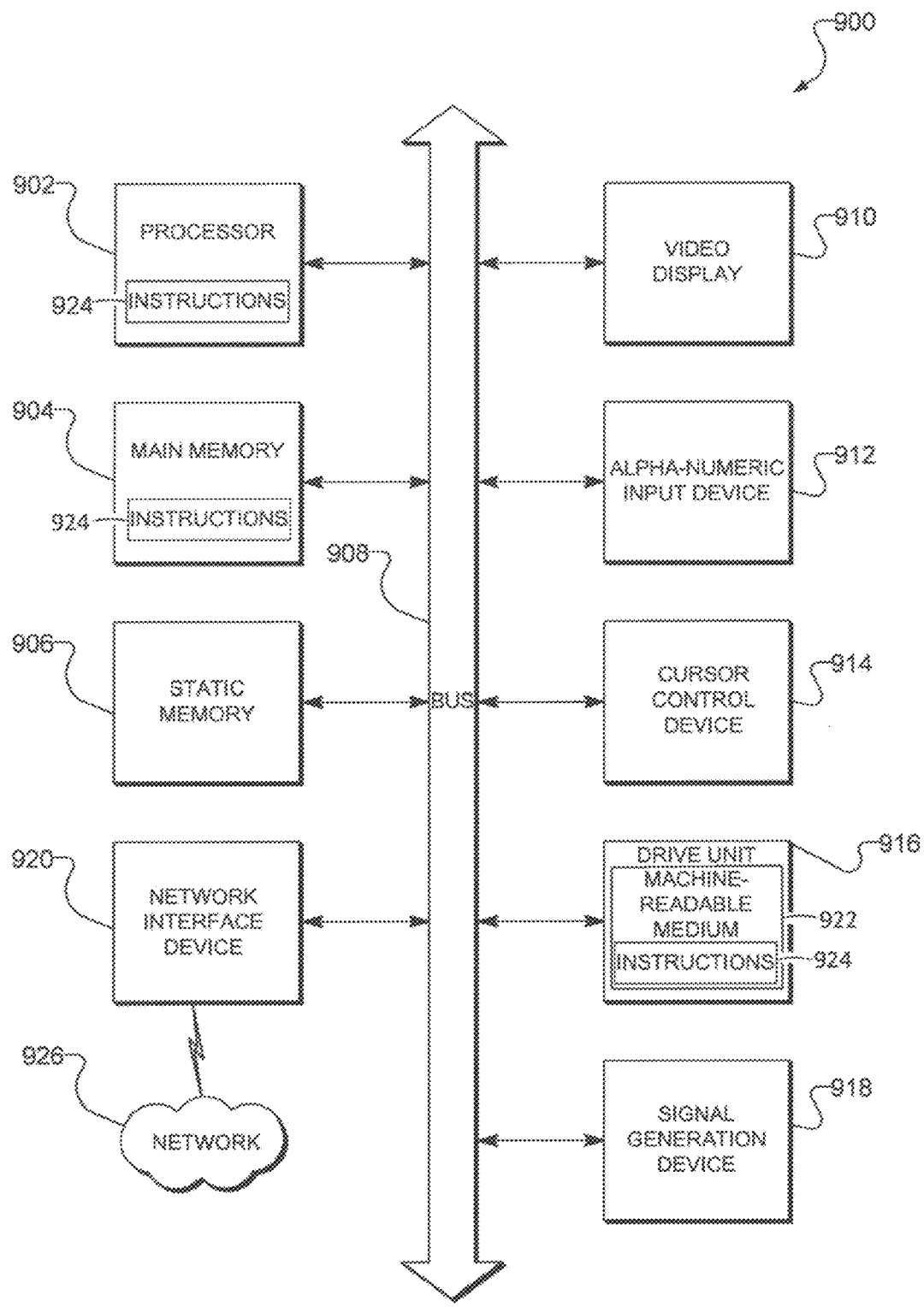
FIG. 9 is a block diagram of a machine in an example form of a computing system within which a set of instructions for causing the machine to perform any one or more of the methodologies discussed herein may be executed.

With reference to FIG. 9, an example embodiment extends to a machine in the example form of a computer system 900 within which instructions 924 for causing the machine to perform any one or more of the methodologies discussed herein may be executed. In alternative example embodiments, the machine operates as a standalone device or may be connected (e.g., networked) to other machines. In a networked deployment, the machine may operate hi the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, a server, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 may include a processor 902 (e.g., a central processing unit (CPU), a graphics processing unit (GPU) or both), a main memory 904 and a static memory 906, which communicate with each other via a bus 908. The computer system 900 may further include a video display unit 910 (e.g., a liquid crystal display (LCD) or a cathode ray tube (CRT)). In example embodiments, the computer system 900 also includes one or more of an alpha-numeric input device 912 (e.g., a keyboard), a user interface (UI) navigation device or cursor control device 914 (e.g., a mouse), a disk drive unit 916, a signal generation device 918 (e.g., a speaker), and a network interlace device 920.

The disk drive unit 916 includes a machine-readable storage medium 922 on which is stared one or more sets of instructions 924 and data structures (e.g., software instructions) embodying or used by any one or more of tire methodologies or functions described herein. The instructions 924 may also reside, completely or at least partially, within the main memory 904 or within the processor 902 during execution thereof by the computer system 900, the main memory 904 and the processor 902 also constituting machine-readable media.

While the machine-readable storage medium 922 is shown in an exemplary embodiment to fees single medium, the term "machine-readable storage medium" may include a single storage medium or multiple media (e.g., a centralized or distributed database, or associated caches and servers) that store the one or more instructions 924. The term "machine-readable storage medium" shall also be taken to include any tangible medium that is capable of storing, encoding, or carrying instructions for execution by the machine and that causes the machine to perform any one or more of the methodologies of embodiments of the present description or that is capable of storing, encoding, or carrying data structures used by or associated with such instructions. The term "machine-readable storage medium" shall accordingly be taken to include, hut not be limited to, solid-state memories, optical and magnetic media, and non-transitory machine-readable storage media. Specific examples of machine-readable storage media include non-volatile memory, including by way of example semiconductor memory devices (e.g., Erasable Programmable Read-only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

The instructions 924 may further be transmitted or received over a communications network 926 using a transmission medium via the network interface device 920 and utilizing any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

It should be noted that various modifications and changes may be made to these example embodiments without departing from the broader spirit and scope of the present inventive subject matter.

As used herein, the term "or" may be construed in either an inclusive or exclusive sense. Additionally, although various example embodiments discussed focus on a specific network-based environment the embodiments are given merely for clarity in disclosure. Thus, any type of electronic system, including various system architectures, may employ various embodiments of the search system described herein and is considered as being within a scope of example embodiments.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of the example embodiments as represented by the appended claims. The specification and drawings are, accordingly, to be regarded in an illustrative rather than a restrictive sense.

What is claimed is:

1. A computer-implemented method comprising:
   causing display of a graph using an application of a computer, the graph comprising at least two axes and a plurality of graphical elements representing data relative to the at least two axes;
   receiving user input highlight rules for the graph, the rules including a user input value and an indication that graphical elements of the plurality of graphical elements should be highlighted based on whether a value of a portion of the graphical elements is greater than the user input value or an indication that graphical elements of the plurality of graphical elements should be highlighted based on whether a value of a portion of the graphical elements is less than the user input value;
   analyzing, using at least one processor of the computer, a value of each graphical element of the plurality of graphical elements, to determine whether a portion of the graphical element is greater than the user input value or whether a portion of the graphical element is less than the user input value, based on the user input highlight rules;
   identifying, using at least one processor of the computer, a portion of at least one graphical element of the plurality of graphical elements that satisfies the user input highlight rules based on the portion of the at least one graphical element of the plurality of graphical elements that is greater than the user input value or the portion of the at least one graphical element of the plurality of graphical elements that is less than the user input value;
   modifying the display of the graph to highlight the portion of the at least one graphical element of the plurality of graphical elements to indicate the portion of the at least one graphical element of the plurality of graphical elements that is greater than the user input value or the portion of the at least one graphical element of the plurality of graphical elements that is less than the user input value based on the user input highlight rules; and
   wherein the modified display of the graph is displayed to the user.

2. The computer-implemented method of claim 1, the rules further including a range between two user input values, or a range not between two user input values.

3. The computer-implemented method of claim 1, wherein the displaying of the graph further comprises:
   displaying at least one axis of the graph; and
   generating a visualization for one or more axis graphical elements corresponding to the portions of the graphical elements that satisfy the user input highlight rules, wherein the one or more axis graphical elements are displayed adjacent the at least one axis to identify the portions of the graphical elements that satisfy the user input highlight rules.

4. The computer-implemented method of claim 1, further comprising modifying a visual format of the portion of each graphical element displayed that satisfy the user input highlight rules relative to a format of other graphical elements that do not satisfy the user input highlight rules.

5. The computer-implemented method of claim 4, wherein the modifying further comprises: displaying the portion of the graphical elements that satisfy the user input highlight rules in a different color than a color of the other portions of the graphical elements that do not satisfy the user input highlight rules.

6. The computer-implemented method of claim 4, wherein the modifying further comprises displaying the portion of the graphical element in a larger dimensions relative to dimensions of other graphical elements that do not satisfy the user input highlight rules.

7. The computer-implemented method of claim 1, wherein a total range of data displayed in the graph remains unchanged after modifying the display of the graph to highlight the portions of each of the graphical elements that satisfy the user input highlight rules.

8. The computer-implemented method of claim 1, wherein the graph is a bar chart, and each of the graphical elements correspond to a bar of the bar chart.

9. The computer-implemented method of claim 1, wherein the graph is a line chart, and each of the graphical elements correspond to a line of the line chart.

10. The computer-implemented method of claim 1, wherein the user input highlight rules indicate that the graphical elements of the plurality of graphical elements should be highlighted based on whether a portion of the graphical element is greater than the user input value, and wherein not all of the plurality of graphical elements have a portion of the graphical element that is greater than the user input value.

11. A system comprising:
a processor; and
a memory comprising instructions which, when executed by the processor, cause the system to perform operations comprising:
displaying a graph using an application of a computer, the graph comprising at least two axes and a plurality of graphical elements representing data relative to the at least two axes;
receiving user input highlight rules for the graph, the rules including a user input value and an indication that graphical elements of the plurality of graphical elements should be highlighted based on whether a value of a portion of the gaphical elements is greater than the user input value or an indication that graphical elements of the plurality of graphical elements should be highlighted based on whether a value of a portion of the graphical elements is less than the user input value;
analyzing a value of each graphical element of the plurality of graphical elements, to determine whether a portion of the graphical element is greater than the user input value or whether a portion of the graphical element is less than the user input value;
identifying a portion of at least one graphical element of the plurality of graphical elements that satisfies the user input rules based on the portion of the at least one graphical element of the plurality of graphical elements that is greater than the user input value or the portion of the at least one graphical element of the plurality of graphical elements that is less than the user input value;
modifying the display of the graph to highlight the portion of the at least one graphical element of the plurality of graphical elements to indicate the portion of the at least one graphical element of the plurality of graphical elements that is greater than the user input value or the portion of the at least one graphical element of the plurality of graphical elements that is less than the user input value, based on the user input highlight rules; and
wherein the modified display of the graph is displayed to the user.

12. The system of claim 11, the rules further including a range between two user input values, or a range not between two user input values.

13. The system of claim 11, wherein the portion of the at least one graphical element comprises data exceeding a user-selected threshold rule, within a user-selected range rule, outside a user-selected range rule, and meeting a user-selected threshold rule.

14. The system of claim 11, wherein at least one axis of the graph is displayed, and a visualization for a one or more graphical elements corresponding to the graphical elements that satisfy the user input highlight rules, and wherein the one or more axis graphical elements are displayed adjacent the at least one axis to identify the user input value.

15. The system of claim 11, wherein a visual format of at least one a portion of the graphical element displayed that satisfy the user input highlight rules is modified relative to a format of other graphical elements that do not satisfy the user input highlight rules.

16. The system of claim 15, wherein the portion of the graphical elements that satisfy the user input highlight rules is displayed in a different color than a color of the other graphical elements that do not satisfy the user input highlight rules.

17. The system of claim 15, wherein the portion of the graphical element is displayed in a larger dimension relative to dimensions of other graphical elements that do not satisfy the user input highlight rules.

18. The system of claim 15, wherein a total range of data displayed in the graph remains unchanged after modifying the display of the graph to highlight the portions of each of the graphical elements that satisfy the user input highlight rules.

19. A non-transitory machine-readable storage medium storing instructions which, when executed by at least one processor, performs operations comprising:
displaying a graph using an application of a computer, the graph comprising at least two axes and a plurality of graphical elements representing data relative to the at least two axes;
receiving user input highlight rules for the graph, the rules including a user input value and an indication that graphical elements of the plurality of graphical elements should be highlighted based on whether a value of a portion of the graphical elements is greater than the user input value or an indication that graphical elements of the plurality of graphical elements should be highlighted based on whether a value of a portion of the graphical elements is less than the user input value;
analyzing a value of each graphical element of the plurality of graphical elements, to determine whether a portion of the graphical element is greater than the user input value or whether a portion of the graphical element is less than the user input value;

identifying a portion of at least one graphical element of the plurality of graphical elements that satisfies the user input highlight rules based on the portion of the at least one graphical element of the plurality of graphical elements that is greater than the user input value or the portion of the at least one graphical element of the plurality of graphical elements that is less than the user input value;

modifying the display of the graph to highlight the portion of the at least one graphical element of the plurality of graphical elements to indicate the portion of the at least one graphical element of the plurality of graphical elements that is greater than the user input value or the portion of the at least one graphical element of the plurality of graphical elements that is less than the user input value, based on the user input highlight rules; and wherein the modified display of the graph is displayed to the user.

* * * * *